Patented Nov. 29, 1949

2,490,004

UNITED STATES PATENT OFFICE 2,490,004

LEATHERLIKE POLYESTER-POLYAMIDES AND PROCESS OF PRODUCING SAME

David W. Jayne, Jr., Old Greenwich, Harold M. Day, Cos Cob, and Edward L. Kropa, Old Greenwich, Conn., assignors to American Cyanamid Company, New York, N. Y., a corporation of Maine No Drawing. Application December 18, 1946, Serial No. 717,090

4 Claims. (Cl. 260—78)

This invention relates to high molecular weight polyester-polyamides and more specifically, to cross-linked polyester-polyamides.

Linear polyesters of high molecular weight are known in the art. These materials are prepared by the reaction of dihydric alcohols with dicarboxylic acids or by the reaction of a hydroxy acid with itself. Moreover, cross-linked polyesters wherein the linear polyesters are cross-linked by means of a small proportion of a polyfunctional compound are described in the art as, for example, in Patent No. 2,363,581.

Linear polyamides of high molecular weight such as the well-known nylon are prepared from aminocarboxylic acids or from polyamines and dicarboxylic acids and are described, for example, in Patents Nos. 2,071,250, 2,130,523 and others.

It is an object of the present invention to prepare cross-linked polyester-polyamides.

It is another object of the present invention to bring about reaction between a polyfunctional compound and a linear polyester-polyamide and thus effect cross-linking of the latter.

It is a further object of the present invention to prepare a high molecular weight cross-linked polyester-polyamide which is a leather-like material.

Another object of the present invention is the preparation of a resinous product which can be readily drawn or calendered.

Still another object of the present invention is the preparation of a product, the tensile strength of which can be markedly increased by cold-drawing or calendering.

A further object of the present invention is the preparation of a granular, high molecular weight polyester-polyamide which can be molded under heat and pressure.

A further object of the present invention is the preparation of a sheet of leather-like material which can be calendered in order to improve its pliability, resiliency and strength.

A still further object of the present invention is the production of leather-like products, the properties of which vary from hard and rubbery, i. e., as in sole leather, to soft and pliable, i. e., as in gloves.

Still a further object of the present invention is the preparation of high molecular weight polymers which have a crystalline structure, said crystals attaining a high degree of orientation upon cold-drawing or calendering of the polymer.

Another object of the present invention is a process for producing polyester-polyamides which have leather-like properties and can be calendered and cold-drawn.

These and other objects are attained by bringing about reaction between a primary straight-chain monoalkylolamine and a saturated aliphatic dicarboxylic acid which does not form an anhydride upon heating in a molar ratio of about 0.85:1, acid to alkylolamine, and then bringing about reaction between the product obtained and tricarballylic acid in a molar ratio of about 0.85:0.1, dicarboxylic acid to tricarballylic acid. The product obtained is cured to a tough, strong, leather-like material by heating.

The invention will be described in greater detail in conjunction with the following specific example in which proportions are given in parts by weight. It should be understood that the example is merely illustrative, and the scope of the invention should not be limited to the details therein set forth.

Example 86 parts of sebacic acid (0.425 mol)
30.5 parts of monoethanolamine (0.5 mol)
8.8 parts of tricarballylic acid (0.05 mol)

A mixture of the sebasic acid and monoethanolamine is heated at 200° C. for 17 hours while being continuously agitated with a stream of carbon dioxide. The tricarballylic acid is added and heating continued for 20 minutes. The viscous resin is poured in a shallow tray and cured by heating for 12–16 hours in a vacuum oven at 160° C. The cured resin sheet is a tough, pliable and strong leather-like material which can be cold-drawn and calendered.

Saturated aliphatic dicarboxylic acids which may be used in the present invention are those which do not form an anhydride upon heating. Acids having at least four carbon atoms between the two carboxyl groups are preferred. Examples of suitable acids are adipic acid, azelaic acid, sebacic acid, pimelic acid, brassylic acid, suberic acid, etc.

In order to obtain a leathery product which can be calendered and/or cold-drawn, a primary straight-chain monoalkylamine, for example monoethanolamine, mono-n-propanolamine, mono-n-butanolamine, etc., must be condensed with the saturated aliphatic dicarboxylic acid. Obviously, mixtures of two or more primary straight-chain monoalkylolamines may be used in place of any single alkylolamine of the type.

The process of the present invention may be carried out at temperatures between 180° and 220° C. and preferably at about 200° C. The reaction is advantageously carried out under reduced pressure, e. g. from about 1-10 mm. of mercury. The time of reaction will be dependent upon the pressure and will also vary in accordance with the particular reactants, the size of the batch, the heat transfer, etc. Generally under reduced pressures of from 1-10 mm. of mercury the reaction will require from about 6-8 hours while with higher pressures the time will be correspondingly longer. If the reactants be heated under atmospheric pressure for a time and then for an equivalent period under reduced pressures of from about 1-10 mm. of mercury, the total reaction time will be about doubled. If the entire reaction be carried out at atmospheric pressure, the reaction time will be about two to three times that prevailing when the entire reaction is carried out under reduced pressure.

It is preferable that the acid and alcohol-amine reactants be employed in approximately stoichiometrically equivalent proportions, but a slight excess of one of the reactants does not necessarily do any harm. In order to obtain products of the desired properties, however, it is essential that the proportions of reactants be carefully controlled and we have found that leather-like products can be obtained by reacting the saturated aliphatic dicarboxylic acid, the primary straight-chain monoalkylolamine, and the tricarballylic acid in a molar ratio of about 0.85:1:0.1.

The generally waxy product obtained upon reaction of saturated aliphatic dicarboxylic acid, primary straight-chain monoalkylolamine, and tricarballylic acid according to the process of the present invention is cured by heating. When the products are cured in the presence of air, surface oxidation apparently occurs and as a result the surface of the cured sheet becomes black and glossy. This black film is less elastic than the under-surface, and accordingly curing under vacuum is advisable. The curing temperature is not critical and may range from about 100°-200° C. We prefer curing temperatures of about 150° to 180° C.

The leather-like products of the present invention can be cured in a granular form, and they can be molded to obtain homogeneous leather-like articles. Molding can be carried out by injection or by compression. Moreover, molded sheets can be cold-calendered whereby the material is partially oriented to yield a hard, leather-like substance which is especially useful as sole leather.

The products of the present invention can also be cured in sheet form, and the resulting leather-like sheets can be cold-drawn or calendered.

In a semi-cured form the products can be used, for example, to impregnate paper, textiles, fibrous materials, etc.

The leather-like materials of the present invention have many uses as leather substitutes. Some of these include the fabrication of shoes, belts, aprons, gaskets, pump diaphragms, purses, wallets, traveling bags, seat coverings for vehicles, upholstery, shoe sole leather, etc. They can be cold-drawn into sheets, fibers, etc., molded into various shapes as bottle tops, containers, etc., and extruded as filaments, rods, tubes, etc. In general, they find application in many industrial fields including laminating, coating, impregnating, etc.

The resins of the present invention may be mixed with ester gum and various alkyd resins, particularly the oil-modified air-drying resins, to produce lacquers, varnishes, enamels, etc. They may also be incorporated with phenol-formaldehyde resins, urea-formaldehyde resins, thiourea-formaldehyde resins, melamine-formaldehyde resins and other amino-aldehyde resins, etc.

Obviously suitable fillers, dyes and pigments may be mixed with the resins to modify the properties thereof as may be desirable.

While we do not wish to be limited to any particular theory of mechanism of reaction, we believe that the saturated aliphatic dicarboxylic acid and the monoalkylolamine first react to form an alkylolamide, which amide self-esterifies to build up a linear polymer. The tricarballylic acid effects cross-linking of the linear polymers, thus producing a flexible or elastic product which, however, has a high tensile strength.

The products of the present invention may vary rather widely in appearance but they have in common a definite, highly oriented crystalline structure, they may be cured by mere heating, and they may be cold-drawn and/or calendered.

We claim:

1. A polyester-polyamide having a definite, highly oriented crystalline structure which is a heat cured condensation product of a primary straight-chain monoalkylolamine of the formula HO—Y—NH$_2$ in which Y is a divalent straight-chain saturated aliphatic hydrocarbon radical, a saturated aliphatic hydrocarbon dicarboxylic acid which does not form an anhydride upon heating, and tricarballylic acid in a molar ratio of 1:0.85:0.1.

2. A polyester-polyamide having a definite, highly oriented crystalline structure which is a heat cured condensation product of monoethanolamine, sebacic acid and tricarballylic acid in a molar ratio of 1:0.85:0.1.

3. A process which comprises bringing about reaction between a primary straight-chain monoalkylolamine of the formula HO—Y—NH$_2$ in which Y is a divalent straight-chain saturated aliphatic hydrocarbon radical, a saturated aliphatic hydrocarbon dicarboxylic acid which does not form an anhydride upon heating, and tricarballylic acid in a molar ratio of 1:0.85:0.1, and curing the reaction product by heating.

4. A process which comprises bring about reaction between a primary straight-chain monoalkylolamine of the formula HO—Y—NH$_2$ in which Y is a divalent straight-chain saturated aliphatic hydrocarbon radical and a saturated aliphatic hydrocarbon dicarboxylic acid which does not form an anhydride upon heating, bringing about reaction between the product so obtained and tricarballylic acid, the molar ratio of monoalkylolamine to saturated dicarboxylic acid to tricarballylic acid being 1:0.85:0.1, and curing the reaction product by heating.

DAVID W. JAYNE, JR.
HAROLD M. DAY.
EDWARD L. KROPA.

REFERENCES CITED

The following references are of record in the file of this patent:

UNITED STATES PATENTS

| Number | Name | Date |
| --- | --- | --- |
| 2,333,639 | Christ et al. | Nov. 9, 1943 |
| 2,363,581 | Frosch | Nov. 28, 1944 |